July 27, 1965

W. T. RENTSCHLER 3,196,768

PHOTOGRAPHIC CAMERA HAVING AUTOMATIC
EXPOSURE SETTING MECHANISM

Filed March 20, 1961

INVENTOR.
Waldemar T. Rentschler
BY
March and Curtiss
ATTORNEYS

July 27, 1965

W. T. RENTSCHLER 3,196,768

PHOTOGRAPHIC CAMERA HAVING AUTOMATIC
EXPOSURE SETTING MECHANISM

Filed March 20, 1961

INVENTOR.
Waldemar T. Rentschler
BY
March and Curtiss
ATTORNEYS

United States Patent Office 3,196,768
Patented July 27, 1965

3,196,768
PHOTOGRAPHIC CAMERA HAVING AUTOMATIC EXPOSURE SETTING MECHANISM
Waldemar T. Rentschler, Calmbach (Enz), Germany, assignor to Alfred Gauthier, G.m.b.H., Calmbach (Enz), Germany, a corporation of Germany
Filed Mar. 20, 1961, Ser. No. 96,741
Claims priority, application Germany, Mar. 22, 1960, G 29,280
1 Claim. (Cl. 95—11)

This invention relates to photographic cameras of the type provided with automatic exposure setting mechanisms wherein a manually operable selector and setting member may be positioned in an "automatic" position and in at least one other position or range, said positions being identified by associated setting markings, and wherein there are control means responsive to the positioning of the selector and setting member, for actuating adjusting mechanisms which control exposure factors such as the diaphragm aperture and exposure time or shutter speed.

An object of the present invention is to provide a novel and improved photographic camera of the above type, wherein the setting or selecting operation is especially optimally clear and foolproof, being capable of quick execution, and wherein there are required no additional components involving increased fabrication costs, in attaining such improved result.

In accomplishing the above object there is provided by the invention a novel organization comprising the said control means and adjusting mechanisms, which further embraces fabricating the selector and setting member as a ring having its axis of rotation parallel to the optical axis of the camera, in conjunction with selectively placed or located setting markings provided on the circumference or periphery of the selector ring, which are cooperable with a fixed setting mark on the camera, these various elements cooperating in such a manner that when the selector ring is placed in the "automatic" setting, only that setting mark which identifies such ring position may be seen by the operator when viewing the camera from the top or upper side, whereas the remaining setting markings associated with the other positions of the selector ring are concealed and blocked from sight when the camera is thus viewed.

The invention thus effects, in a camera of the automatic setting type outlined above, an optimum clarity of operation and speed in effecting the various settings desired, all without requiring additional components, assembly operations or involving any additional fabrication costs. The above outlined disposition of the setting markings on the selector ring, based upon a special arrangement of the control means which is associated with the selector ring, eliminates misunderstanding and uncertainties with respect to the camera settings and with respect to the various adjusted positions of the manually operable selector and setting ring. In a camera constructed in accordance with the invention the operator is able to select the automatic setting of the manually operable selector ring quickly and dependably, without distraction or irritation such as might be occasioned by the presence of other setting markings located adjacent the particular marking indicating the said "automatic" position and which are viewed simultaneously with such particular setting marking. He is further able to see at a glance and at any moment that the selector ring is properly placed in the "automatic" setting position (or any other desired position) as required by the existing light conditions or according to his desire.

In accordance with a further construction as provided by the invention, the above described advantage relating to the setting of the selector ring in the "automatic" position is obtainable not only for such setting but also for additional settings of which the said ring is capable and which are also identified by setting markings. Thus, upon the selector ring being placed in either one or two additional setting positions differing appreciably from the "automatic" setting position, only that one particular setting marking which is associated with the said additional position will be seen when viewing the camera from above. The disposition of the different setting markings can be advantageously effected, in cameras wherein the selector ring has but one additional setting marking besides the "automatic" marking, by arranging the control means as that the two setting markings are approximately diametrically opposite each other on the selector ring.

In cameras as provided by the invention wherein the selector ring has two additional setting markings besides the "automatic" setting marking, the disposition of the three setting markings are such that they are substantially equi-angularly spaced about the periphery or circumference of the ring by an appropriate arrangement of the control means.

The invention is illustrated by means of two embodiments in the accompanying drawings, wherein;

FIGURE 1 is a diagrammatic fragmentary top plan view of a photographic intra-lens shutter and camera body construction, having a manually operable selector and setting ring as provided by the invention, on which ring there are disposed in the manner proposed by the invention setting markings for executing photographic exposures utilizing the automatic exposure setting mechanism (identified by the marking "auto"), for executing bulb exposures (B-exposures identified by the letter "B"), and also for executing flash exposures (identified by a jagged arrow symbol). The selector ring in FIGURE 1 is shown in the "automatic" position.

Figure 5:
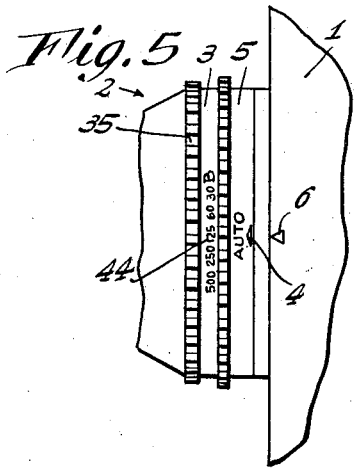

FIGURE 5 is a fragmentary diagrammatic top plan view of another photographic intra-lens shutter and camera structure as provided by the invention, incorporating a novel manually operable selector and setting ring which differs from that shown in FIGS. 1–4 in that it has only two setting markings, namely "auto" (automatic) and "manual" (non-automatic). The selector and setting ring is shown in the "auto" position.

Figure 6:
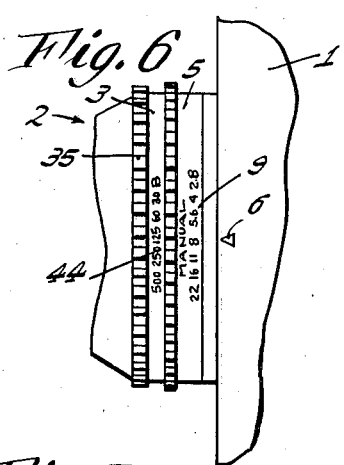

FIGURE 6 is a view similar to that of FIG. 5, but showing the selector and setting ring in the "manual" setting.

Figure 7:
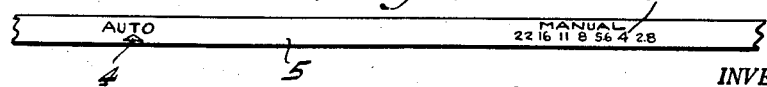

FIGURE 7 is a developed or extended (flattened) view of a portion of the outer circumference of the selector ring of FIGS. 5 and 6, illustrating the two setting markings which are disposed thereon.

Figure 8:
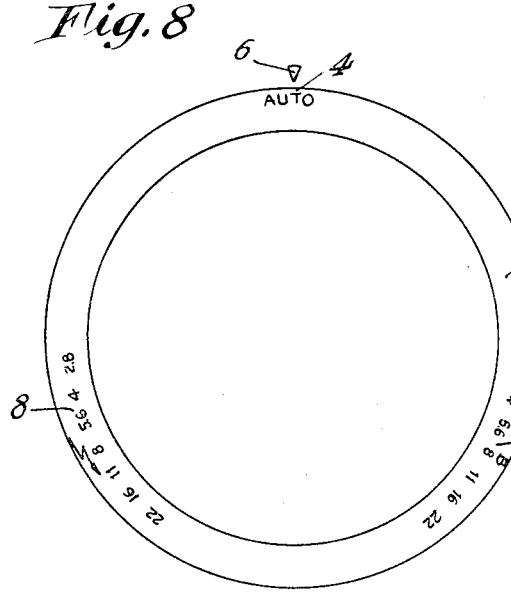

FIGURE 8 is a diagrammatic front view of the selector and setting ring as provided for the embodiment of the invention illustrated in FIGS. 1–4.

Figure 9:
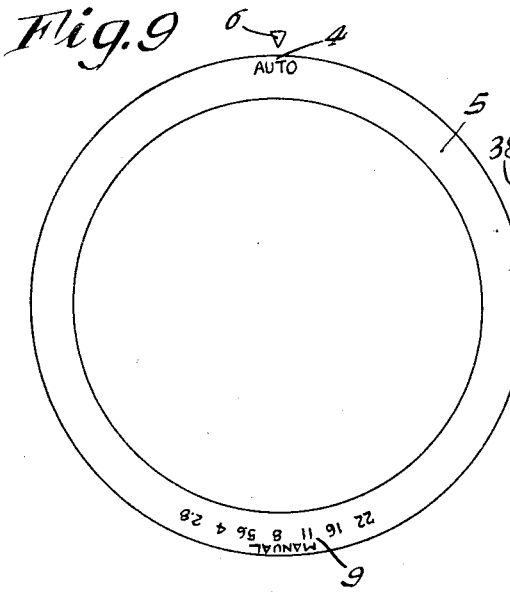

FIGURE 9 is a view similar to that of FIG. 8, but showing the selector and setting ring as provided for the embodiment illustrated in FIGS. 5–7.

Figure 10:
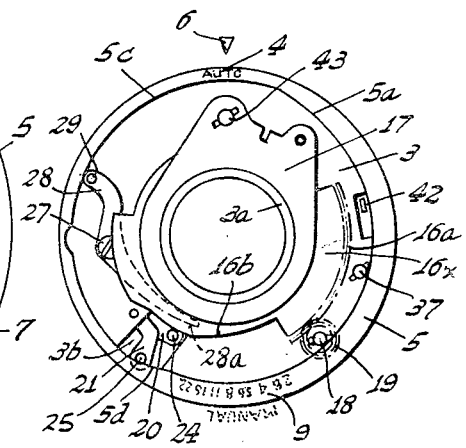

FIGURE 10 is a diagrammatic rear elevational view showing the shutter utilized in the embodiment of the invention illustrated in FIGS. 5 and 6. Shown in this figure are members or components of a diaphragm setting mechanism including cooperable cams which are provided on the selector ring and also on an automatically operative diaphragm adjusting ring. The components are shown in the positions required for the camera to be ready for an exposure involving an automatic diaphragm setting.

Figure 1:
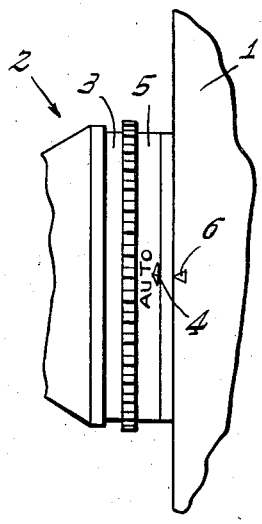
Figure 2:
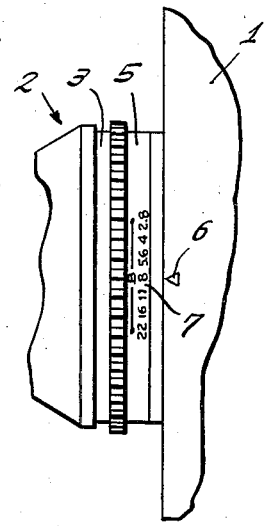
FIGURE 2 is a view similar to that of FIG. 1 but showing the selector ring set for B-exposures.
Figure 3:
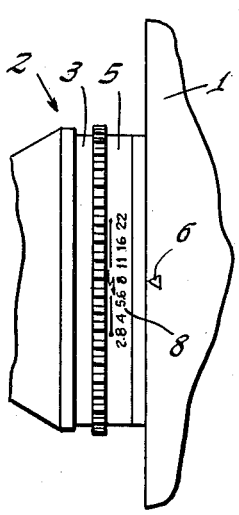
FIGURE 3 is a view like that of FIGS. 1 and 2, but showing the selector ring set for flash exposures.
Figure 4:
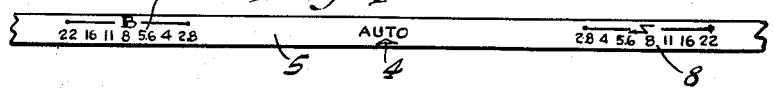
FIGURE 4 is a developed or extended (flattened) view of a portion of the outer circumference of the selector and setting ring of FIGS. 1–3, showing the various setting markings provided thereon.
Figure 11:
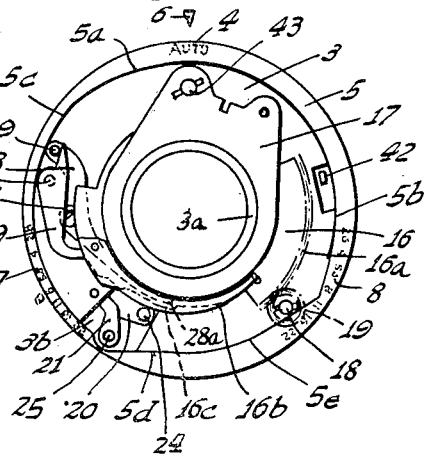

FIGURE 11 is a view similar to that of FIG. 10 but showing a shutter construction as provided in the embodiment of the invention illustrated in FIGS. 1–3. In this figure there are revealed members or components of the adjusting mechanisms for the diaphragm aperture and the shutter speed or exposure time, cooperating with cams which are provided on the selector and setting ring and on an automatically operative adjusting or exposure value ring. The components shown are in the positions required, in order to be ready for an exposure utilizing an automatic exposure setting.

Figure 12:
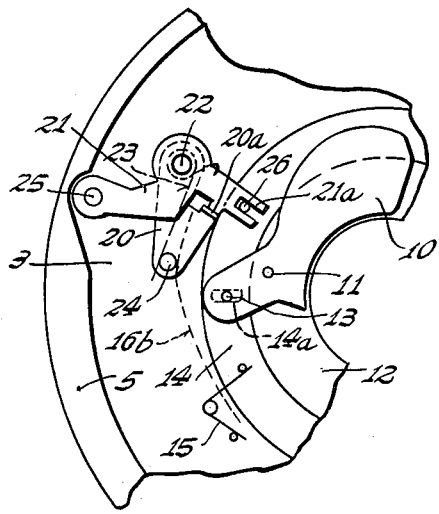

FIGURE 12 is a fragmentary detail, in elevation, of a diaphragm control means such as may be utilized in both the embodiemnts of FIG. 10 and FIG. 11. This figure also shows portions of the adjusting mechanism associated with the diaphragm, the latter being in its fully open position and the components being in the positions required in order for the camera to be ready for an exposure utilizing an automatic diaphragm setting.

Figure 13:
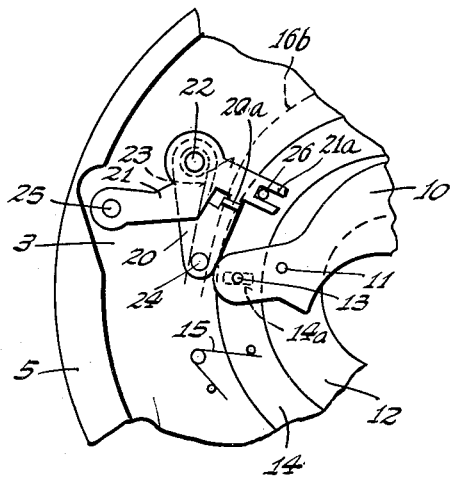

FIGURE 13 is a view similar to that of FIG. 12, but showing the positions of the components at a point in the setting process.

Figure 14:
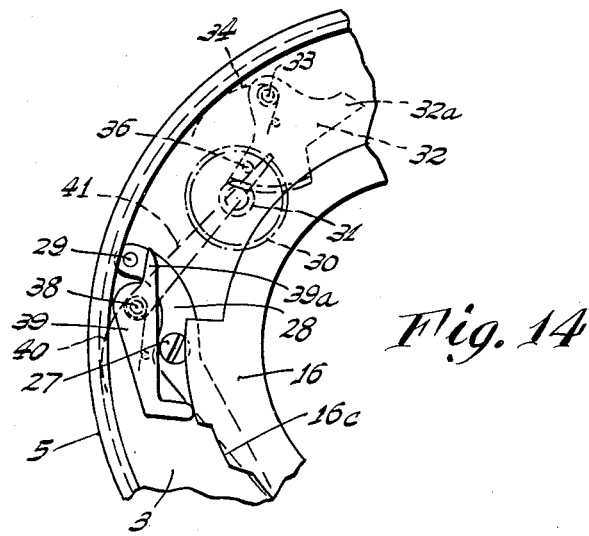

FIGURE 14 is a fragmentary rear elevational view of a portion of the photographic shutter illustrating an exposure time adjusting mechanism which may be utilized with the embodiment of FIG. 11. This view illustrates the cooperation of the members or components of the exposure time adjusting mechanism, including an escapement mechanism.

Referring first to FIGS. 1–4, 8 and 11–14 illustrating one embodiment of the invention, the housing or case of the photographic camera is indicated by the numeral 1. Attached to the front side of the camera case 1 is a photographic intra-lens shutter construction 2. The said shutter construction comprises a shutter housing 3, on the back of which there is provided in a well known manner a tubular connection or nozzle 3a serving to receive lenses of the objective as well as to affix the intra-lens shutter construction to the camera case. Built into the shutter housing 3 are a settable lamella-type (segment) diaphragm and a well-known exposure time escapement mechanism arranged to be adjusted for effecting different escapements and exposure times. The exposure time escapement mechanism is shown diagrammatically in FIG. 14. For the purpose of setting the diaphragm aperture and the exposure time, there is provided by the invention adjusting devices or mechanisms (to be described below) which can be coupled or uncoupled selectively with an automatic exposure regulating device by means of a manually operable selector and setting member mounted on the outer circumference of the shutter housing 3 and which can be manually actuated or set. For the purpose of effecting such setting to obtain an automatic adjustment, a setting mark 4 identified by the word "auto" is provided. Other identifying setting markings to be described below in detail are also provided on the selector and setting member.

In order to obtain an optimal operational clarity and dependability the manually operable selector and setting member, in accordance with the invention, is constituted as a ring 5 having an axis of rotation which is parallel with the optical axis and preferably coincides therewith. The setting markings on the ring 5 are arranged on the circumference thereof and are cooperable with a fixed setting mark 6 provided on the camera case 1, by virtue of their being positionable adjacent or opposite the said fixed setting mark. Further, the control means which is associated with the selector and setting ring 5 and which cooperates with the adjusting mechanisms for the diaphragm aperture and/or the exposure time are constructed in the form of cams in the illustrated embodiment of the invention, such cams being provided on the selector ring 5 in relative positions such that, upon the said ring being set at the "automatic" position only the single setting marking identifying such position will be in sight when the operator views the camera from the top or upper side thereof, whereas the other setting markings associated with the other positions of the selector ring will be concealed from view by the latter.

As regards the other setting markings, in the embodiment of the invention shown in FIGS. 1–4, 8 and 11–14 there are arranged on the selector ring 5 a diaphragm scale 7 identified by the letter "B" for the purpose of manually setting the diaphragm aperture in the case of "B-exposures," as well as a diaphragm scale 8 provided with the symbol of a flash (a jagged arrow) which serves to set the diaphragm aperture in the case of flash exposures.

The foregoing arrangement insures that the operator when looking at the top of the camera will see only the designation "auto" as the selector ring 5 is placed in the automatic position, whereas the other setting markings or indications will not be visible when the camera is so viewed, by virtue of the line of sight to such other markings being blocked by the selector ring. Also, when the selector ring 5 presents the other markings 7 and 8 at the index mark 6 in each instance only the one single setting marking will be visible from the top of the camera, whereas the remaining setting markings will be hidden from view by the said ring. This has the advantage that the greatest possible simplicity and clarity is obtained when effecting the various settings of the camera, while at the same time there is avoided additional expenditure such as may be occasioned by added parts or components, assembly operations and the like.

The iris diaphragm which is built into the rear portion of the shutter housing 3 comprises lamellas or segments 10 only one of which is shown for the sake of clarity of illustration. The lamellas 10 are relatively positioned in a well known manner about pins 11 carried by a fixed bearing plate 12, and have pin-and-slot connections 13, 14a with a turnable actuating ring 14. A spring 15 (FIGS. 12, 13) tends to keep the ring 14 in a clockwise shifted position corresponding to the smallest diaphragm aperture.

A turnable, automatically operative exposure-value adjusting ring 16 is used for regulating the diaphragm when the camera is set in the "automatic" position, whereas the adjustment of the diaphragm is effected otherwise, by means of the manually operable selector and setting ring 5, when the camera is set for taking B-exposures, flash exposures, or manually adjusted exposures, all involving manual adjustment of the diaphragm aperture. The automatically operative adjusting ring 16 is rotatably carried about the tubular connection 3a provided on the rear wall of the shutter housing 3, and is held against axial movement by a plate 17 affixed to the said rear wall of the shutter housing. Associated with the automatically operative adjusting ring 16 is a driving device or mechanism comprising a driving shaft 18 positioned on the rear wall of the shutter housing 3, having a gear 19 which is affixed to the shaft 18 and which meshes with a toothed segment 16a provided on the ring 16. FIGURES 10 and 11 show the adjusting ring 16 in the position which is associated with the cocked state of the driving mechanism 18, 19 and in which it is retained by means of a locking device (not shown for reasons of clarity of illustration). For the purpose of releasing the adjusting ring 16, the said locking device can be released preferably in response to actuation of the camera or shutter release member 42 (FIGS. 10 and 11) whereas the film transporting or advancing mechanism of the camera may serve to cock the driving mechanism 18, 19 for the ring 16. Such release of the automatic exposure adjusting mechanism in response to actuation of the camera or shutter release and cocking of said mechanism concurrently with advance of the film are well known in the camera art, and details of these mechanisms are accordingly not given herein, since they form no part of the present invention.

The driving shaft 18 on which the gear 19 is affixed serves in the illustrated embodiments of the invention to connect the automatically operative adjusting ring 16 to a well-known light-intensity measuring device which is not shown herein for reasons of clarity of illustration. Devices for automatically operating an adjusting member by a light intensity measuring device are well known per se, and the invention does not relate to such devices. In the present illustrated embodiments of the invention such a device may, for example, be constructed in such a manner that the shaft 18 serves to move a sensing member which is guided to engage a stop carried by the movable member of the light measuring device, as for example the needle of a galvanometer.

Devices for driving an exposure-value adjusting member are also well known per se, and the end member of such a driving device may comprise the shaft 18 illustrated in FIGS. 10 and 11. Therefore, details of such a driving device are not illustrated herein for reasons of clarity.

Details of such automatic setting mechanism, including the powered drive therefor, may be found in the patent of Karl F. Rentschler et al. No. 2,887,025 dated May 19, 1959 and entitled "Photographic Shutter with Exposure Regulator." Also, such details may be found in my copending applications Serial No. 5,133 filed January 29, 1960 and entitled "Photographic Camera," and Serial No. 837,910 filed September 3, 1959 and entitled "Photographic Camera with Automatic Exposure Setting."

The automatically operative adjusting ring 16 has a cam 16b by means of which the adjusting ring 14 of the diaphragm may be regulated when the selector ring 5 is set in the "auto" position. A cam 5a (FIG. 10) and cams 5a and 5b (FIG. 11) provided on the selector ring 5 serve to adjust the diaphragm in the case of manual setting of the aperture when non-automatic operation is desired.

The connection between the automatically operative adjusting ring 16 and the manually operable selector and setting ring 5 on the one hand, and the diaphragm adjusting ring 14 on the other hand, is effected by means of two pivotally mounted levers 20 and 21, which are pivotally carried by a common fixed pivot pin 22 provided on the inside of the rear wall of the shutter housing 3. A spring 23, which is carried by the pin 22, tends to bias the lever 20 in a counterclockwise direction and to maintain a lug 20a thereof in engagement with one arm of the lever 21. The levers 20 and 21 operate with the aforementioned cams 16b, and 5a and 5b of the rings 16 and 15 in a manner to be described below, and for this purpose carry cam follower pins 24 and 25 for which a clearance recess or opening 3b is provided in the rear wall of the shutter housing 3. In addition, the lever 21 which cooperates with the manually operable selector and setting ring 5 has a pin-and-slot connection 21a, 26 with the diaphragm adjusting ring 14. In order to obtain a simple adjustment of the diaphragm regulating device, the pins 24 and 25 are constructed as eccentric pins in a well known manner.

For the purpose of eliminating the control influence of the automatically operative adjusting ring 16 when the setting ring 5 is placed in the non-automatic B and flash exposure positions, the lever 20 which cooperates with the ring 16 is pivoted, for such settings of the ring 5, into an inoperative position wherein it is located outside of the path away from the reach of the cam 16b. This is accomplished by the application of a shifting force to the pin 24 of the lever 20, moving said pin downward and to the left when viewing FIGS. 10 and 11.

For this purpose there is provided a lever 28 which is pivotally mounted about a pivot pin 27 secured to the rear wall of the shutter housing 3. The lever 28 carries on one of its arms a cam follower pin 29. A member 5c of the selector ring 5, which member is concentric with the optical axis is arranged opposite the pin 29 when the selector ring 5 is placed in the "automatic" position. For such position, the lever 28 is pivoted in a counterclockwise direction to such an extent that an arm 28a of the lever (shown by a broken line in the figures) is disposed outside of the path of movement of the pin 24 affixed to the control lever 20, whereby the latter control lever is able to carry out its adjusting function as effected by the cam 16b of the automatically operative adjusting ring 16 after the shutter has been released.

Upon the selector ring 5 being placed in either of the non-automatic settings, on the other hand, a pivotal movement of the lever 28 in a clockwise direction is effected by means of cams provided on the selector ring 5 (to be described below) whereby the arm 28a of the lever 28 engages the pin 24 of the control lever 20 to retain the latter in an inoperative position corresponding to the largest diaphragm aperture.

A gear escapement mechanism of a well known type per se (FIG. 14) is utilized for obtaining different exposure times, as has been already mentioned above. The said escapement mechanism is affixed to a base plate (not shown for reasons of clarity) which carries the members of the shutter mechanism. The gear escapement mechanism includes a gear 30 together with a pinion 31 affixed thereto. The gear 30 is connected to and followed by other gear members of the escapement mechanism, which are not shown for reasons of clarity of illustration. The driving power for the escapement mechanism is effected by an actuating lever constructed as a toothed segment 32 which cooperates, by means of a projection 32a, with the main drive member of the shutter in a well known manner (not shown for reasons of clarity). Further, non-illustrated details of such escapement mechanism are shown and described, for example, in the patent of Karl F. Rentschler No. 2,961,935 dated November 29, 1960 and entitled "Photographic Shutter," also in my Patent No. 2,948,205 entitled "Intra-Lens Shutter," and my Patent No. 2,949,075 dated August 16, 1960 and entitled "Intra-Lens Shutter." The actuating lever 32 is pivotal about an axis 33 provided on the shutter base plate, and is influenced by a spring 34 which biases it counterclockwise, tending to keep it in the position shown in FIG. 14 corresponding to the greatest escapement (arresting or retarding) effect.

The shifting of the toothed segment 32 for the purpose of obtaining different exposure times is effected, in the shutter of FIGS. 1–4, 8 and 11–14 in response to positioning of the automatically operative exposure-value adjusting ring 16.

Still considering the embodiment of the invention illustrated in FIGS. 1–4, 8 and 11–14, the toothed segment 32 is actuated in response to adjustment of the automatically operative exposure value adjusting ring 16 or else in response to adjustment of the manually operable selector and setting ring 5. For this purpose a lever 39 is provided, carried by and affixed to a shaft 38 bearing in the rear wall of the shutter housing 3. The lever 39 cooperates, under the action of a spring 40 which biases it in a counterclockwise direction, with a cam 16c provided on the automatically operative ring 16. Affixed to the other end of the shaft 38 which projects into the interior space of the shutter construction, is another lever 41 (FIG. 14) which is engaged with the pin 36 provided on a toothed segment 32, such engagement involving the action of the spring 34.

The above mentioned lever 28 having the pin 29 which cooperates with a projection 39a of the lever 39 serves to eliminate the control influence of the cam 16 on the lever 39 in the case of non-automatic exposure settings (B-exposures and flash exposures). That is, the lever 28 renders inoperative the driving and adjusting connection between the exposure value adjusting ring 16 and the lever 39 which controls the exposure time. Such action has the effect that the lever 39 is retained in a starting position associated with the longest exposure time, as for example 1/30 sec. in the illustrated embodiment of the invention shown in FIGS. 1–4, upon the selector ring 5 being placed in either the "B" or "flash" settings.

A comparison of the embodiment of FIGS. 1–4 with the embodiment of FIGS. 5–7 is as follows:

In the embodiment of FIGS. 5 to 7 and 10, the adjusting ring 5 has, in addition to the "auto" setting mark 4, only one other setting marking in the form of a diaphragm scale 9 identified by the word "manual." As is apparent from the figures, the three setting markings 4, 7 and 8 in the shutter of FIGS. 1 to 4 and 11 are arranged at approximately equal angular distances, i.e., at angular distances of about 120° on the ring 5, while the two setting markings 4 and 9 in the shutter of FIGS. 5 to 7 and 10 are approximately diametrically opposite.

Considering the embodiment of the invention illustrated in FIGS. 5–7, 9, 10, 12 and 13 a different action occurs with respect to the lever 28 and its response to setting movement of the selector ring 5. While in FIGS. 1–4 and 11–14 as explained above the cams 5a, 5d, 5b and 5e are used in actuating the lever 28, in the embodiment of FIGS. 5–7 etc. the pivoting of the lever 28 is accomplished by either the cam 5a or else the cam 5b, depending upon the direction of turning of the ring 5 from the "auto" position shown in FIG. 10. Such action is utilized to apply shifting force to the pin 24 of the lever 20, thereby to shift and hold the lever 20 away from the cam 16b of the automatically operative adjusting ring 16.

In FIGS. 5–7 and 10, the adjustment for shifting of the toothed segment 32 for the purpose of obtaining different exposure times is effected by means of a special exposure time setting ring 35 which is independent of the adjusting ring 5 and which has a well known cam (not shown) engageable with the pin 36 provided on the toothed segment 32, the latter being retained in such engagement by the action of the spring 34.

The exposure time of the shutter which is selected, as well as the adjusting for exposure-influencing factors which are different from the diaphragm, such as the factors of film sensitivity and filter, can be taken into consideration by providing for an adjustable mounting of the measuring mechanism of the exposure meter, enabling the said mechanism to be rotatably adjustable in a well-known manner.

A shaft 37 serves to transmit the respective setting positions of the ring 35 (FIG. 10). The shaft 37 has a bearing in the rear wall of the shutter housing and is connected by means of gearing (not shown) with the exposure time setting ring 35. The shaft 37 may also be coupled to a carrier plate for the measuring mechanism of the exposure meter, by means of suitable gearing or transmission devices, to effect a rotary adjustment of such carrier plate for the purpose of effecting additional exposure influencing factors such as the factors of film sensitivity and filter. Except for the above differences, the second embodiment (of FIGS. 5–7 etc.) is similar (as regards diaphragm adjustment, etc.) to the embodiment of FIGS. 1–4 etc. and the descriptive matter of FIGS. 1–4 thus applies equally to the second embodiment.

The camera comprising the embodiment of the invention illustrated in FIGS. 1–4, 8 and 11–13 operates and functions in the following manner:

(1) Effecting an exposure with automatic exposure setting.

As is apparent from FIG. 11, the manually operable selector ring 5 is placed in the "auto" position for the purpose of making exposures utilizing the automatic setting mechanism. For this position of the selector ring 5 only the setting mark 4 ("auto") is visible to the operator, when the camera is viewed from the top.

The automatically operative exposure-value adjusting ring 16 is also disposed in the position illustrated in FIG. 11, wherein the driving mechanism 18, 19 is cocked and the automatic exposure mechanism of the camera is in readiness for functioning.

The automatic exposure-value adjusting ring 16 is released to run down in a clockwise direction in response to releasing actuation of the camera release member 42 shown in FIG. 11. Depending on the prevailing light intensity, the adjusting ring 16 will be halted after a shorter or longer movement, by impingement of a sensing member (which is driven by the shaft 18) upon a movable member of the light intensity measuring device. The two pairs of levers 20, 21 and 39, 41 respectively for adjusting the diaphragm aperture and the exposure time now experience a pivotal movement, upon the running down of the adjusting ring 16, under the action of the respective springs 15 and 40, such movement being controlled by the cams 16b and 16c of the ring 16. The movement of the lever pair 20, 21 is transmitted to the diaphragm adjusting ring 14 by way of the lever 21, whereas the movement of the lever pair 39, 41 is imparted by means of the shaft 38 and the lever 41 to the actuating lever 32 of the exposure-time escapement mechanism. This provides the result that both the diaphragm aperture and the exposure time are automatically set at correlated values corresponding to the prevailing light intensity.

(2) Effecting "B" and flash exposures.

For this purpose, the manually operable selector and setting ring 5 is adjusted in either a clockwise or in a counterclockwise direction until the desired diaphragm value of either the scale 7 or the scale 8 is opposite the fixed setting mark 6. During such operation, only the diaphragm scale which is associated with the type of exposure desired, will be disposed in the visual range or range of view of the operator. When the said adjustment is being effected, the lever 28 is pivoted in a clockwise direction by means of the control cam 5d or else the control cam 5a, and the control levers 20 and 39, 41 for the diaphragm and the exposure time are thereby moved into a position corresponding to the largest diaphragm aperture and to the longest exposure time (as for example an exposure of 1/30 second) for which position the control influence of such levers is eliminated.

For the purpose of manually setting the diaphragm in the case of "B" and flash exposures, the aforesaid cams 5a and 5b are actuated with adjustment of the setting ring 5. The cam 5a influences the diaphragm in the case of flash exposures, whereas the cam 5b adjusts the diaphragm in the case of B-exposures. For this purpose, the two cams cooperate with a pin 25 of the control lever 21 which is connected to the adjusting ring 14 of the diaphragm. For the purpose of obtaining B-exposures, a well-known B-device (not shown for reasons of clarity) is placed in operative position upon the selector ring 5 being moved to the "B" setting. This is effected by means of a control surface (not shown) provided on the wall of the selector ring 5. The B-device, when in operative position, retains the shutter in its open position after it has been released, for the duration of depression of the shutter release member 42. When the selector and setting ring 5 is not in the setting range identified with the letter "B," the "B-device" is rendered inoperative.

The mode of operation of the shutter illustrated in FIGS. 5–7 and 10 corresponds with respect to the setting of the diaphragm fully to that of the shutter illustrated in FIGS. 1–4, 11 and 14, and the structures are mostly similar or identical so that it is unnecessary to repeat the explanations. The sole difference between the shutters of the two embodiments consists, as already mentioned, in the manner of setting the exposure time which, in the shutter of FIGS. 5–7 and 10 can be freely selected both in case of the "automatic" setting and in the case of "manual" setting of the selector ring 5, such free selection being made possible by means of the separate exposure time setting ring 35 having the exposure time scale 44 which is referable to the fixed setting mark 6.

I claim:

In an automatically settable photographic camera, a manually operable combined selector and setting ring turnable about an axis of rotation concentric with the optical axis of the camera and positionable in either an "automatic" position of another position appreciably different from said "automatic" position, said ring having spaced setting markings on its periphery indicating the said positions; a fixed reference mark on the camera, cooperable with said setting markings and arranged to be fully seen when viewing the camera from the top, said selector and setting ring when positioned to locate one or the other of the setting marking adjacent the reference mark effecting a concealment of the other setting marking when the camera is so viewed, by obstructing the view to said other mark; a setting mechanism on the camera adapted to control an exposure factor of the camera; automatic adjusting means by which said setting mechanism is adapted to be automatically adjusted; cam means carried by said combined selector and setting ring by means of which said automatic adjusting means is rendered inoperative when said combined selector and setting ring is in said another position; other cam means carried by said combined selector and setting ring by means of which said automatic adjusting means is rendered operative when said combined selector and setting ring is turned from said another position to said automatic position; and manually operable means by which said setting mechanism is adapted to be adjusted when said combined selector and setting ring is in said another position.

References Cited by the Examiner

UNITED STATES PATENTS 2,985,082   5/61   Starp _____ 95—10

NORTON ANSHER, *Primary Examiner.*

JOHN M. HORAN, *Examiner.*